May 20, 1952  A. F. REILLY  2,597,749
CONDIMENT HOLDER
Filed May 19, 1948
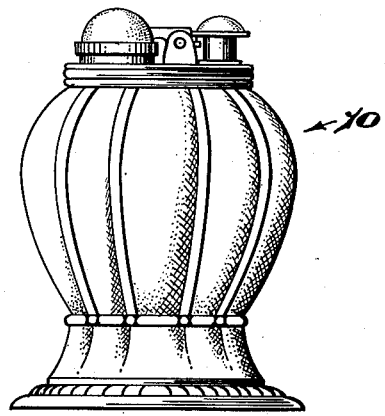
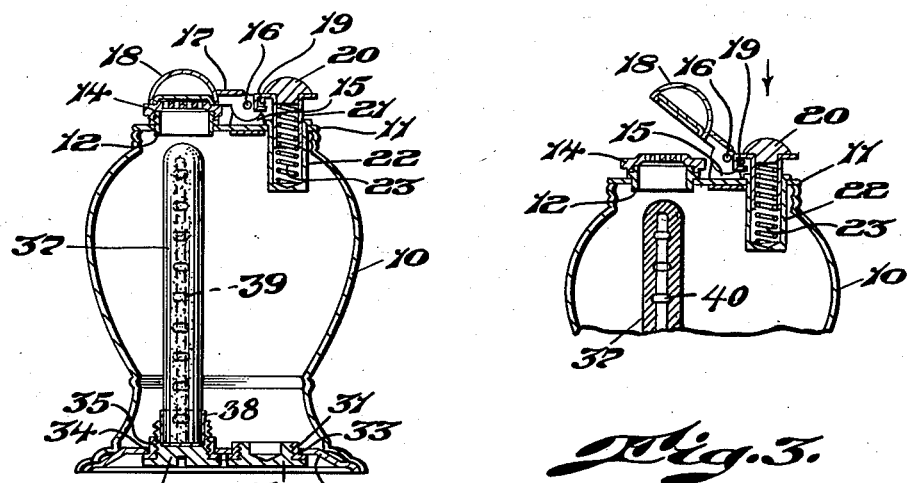
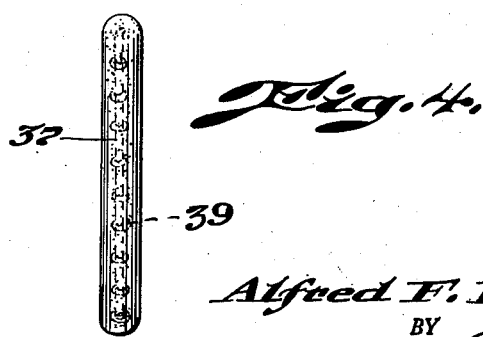
INVENTOR.
Alfred F. Reilly
BY
Barlow & Barlow
Attorneys Patented May 20, 1952

2,597,749

UNITED STATES PATENT OFFICE 2,597,749

CONDIMENT HOLDER

Alfred F. Reilly, North Attleboro, Mass., assignor to Evans Case Co., a corporation of Massachusetts Application May 19, 1948, Serial No. 27,880

5 Claims. (Cl. 222—190)

1

This invention relates to a condiment holder, and more particularly for holding salt.

The discharge opening for dispensing salt or other condiment from a container usually permits the passage of some air laden with moisture into the container, and due to the hygroscopic nature of the condiment, particularly salt, the same becomes hard or caked, and prevents shaking of the same from the holder. Different attempts have been made to prevent this caking.

One of the objects of this invention is to provide an arrangement so that the moisture which does enter into the condiment holder will be absorbed by a material which is located within the container and thus will leave the condiment free for shaking from the container.

Another object of this invention is to provide an absorbent material which will have a greater affinity for moisture than the condiment contained in the holder.

Another object of this invention is to provide the moisture-absorbing or hygroscopic solid material which will present a rather large area within the container.

Another object of the invention is to provide a solid hygroscopic material which may be readily replaced in the container when the same has become charged with moisture, or which may be dehydrated if desired.

With these and other objects in view, the invention consists of certain novel features of construction as will be more fully described and particularly pointed out in the appended claims.

Figure 1 is an elevational view of the container;

Figure 2 is a central sectional view of the container illustrating the hygroscopic material in place;

Figure 3 is a fragmental view similar to Figure 1 illustrating the cover as in raised position; and Figure 4 is a perspective view of the hygroscopic material.

In proceeding with this invention I provide a hollow body with a top wall having a suitable opening for the condiment contained within the body. In the bottom wall, in addition to a filling opening, there is provided an opening having a plug which carries the hygroscopic material in the form of a stick or rod protruding into the hollow body and which may be readily removed by unscrewing the plug from the bottom wall. The hygroscopic material is close to the discharge opening so as to be in a location to readily pick up the entrance of moisture through this opening.

2

With reference to the drawings, 10 designates generally the hollow body of the container having a top wall 11 which has an opening therein in which there is mounted a collar 12 having a perforated end wall 14 through which the contents of the body, such as salt or any other condiment, may be shaken. A pair of ears 15 extend upwardly from the top wall and are provided with a pivot pin 16 for pivotally mounting the lever 17 having a closure cap 18 at one end to extend over the perforated wall 14 and close the same while the other end of this lever is provided with a pin 19 which is embraced by the U-shaped portion of the plunger 21 having a head 20, which plunger may be telescoped into the well 22 set into the top wall and provided with a spring 23 to urge the same outwardly. Upward movement of the plunger will also serve to close the cover and maintain some pressure upon the perforated wall 14.

There is a bottom wall 30 having an opening 31 with a closure plug 32 threaded into the collar 33 about this opening to close the same, while at another location axially aligned with the discharge opening collar 12 there is an opening 34 having a threaded collar 35 which is closed by threaded plug 36. This plug 36 carries a rod or stick 37 of some material which has a greater affinity for moisture than any of the usual condiments, and more particularly a greater affinity for moisture than salt, and while there may be several such materials, a material which I have found highly desirable is formed by admixing plaster 10 kilograms, cold water 20 liters, lime 200 grams, and disodium phosphate 75 grams. The mixture is maintained in suspension by stirring it until the formation of a creamlike viscosity may be observed and then it is poured into molds of a suitable shape to provide the stick or rod 37. It is removed from the molds after hardening, and conveniently dried, such as by exposure to heat. This stick material is readily mounted upon the plug 36 as by a cup 38 and may be interchanged with a different stick placed into the plug or the material, as it has become charged with moisture, may be regenerated by heating to dehydrate the same. In some cases a reenforcing core 39 of metal or other stiff material may be molded into the rod of hygroscopic material. This core will have enlarged portions 40 spaced along its length which act to prevent separation of the material from the core should a lateral crack or rupture occur in the stick.

I claim:

1. A condiment holder comprising a hollow body having a top wall with a discharge opening and closure cover hinged to swing over said discharge opening, a bottom wall with an opening therein, a plug to close said opening, and a one-piece unit of hygroscopic material secured to said plug and extending therefrom inwardly into said body and removable with said plug as a unit through said opening for reactivating.

2. A condiment holder as in claim 1 wherein said unit extends into close proximity to said discharge opening.

3. A condiment holder as in claim 1 wherein the condiment in said holder surrounds and directly contacts said unit.

4. A condiment holder as in claim 1 wherein said unit has a single one-piece core of stiffer material embedded therein.

5. A condiment holder as in claim 1 wherein said unit has a single cylindrical core of stiffer material embedded therein with enlarged portions at spaced locations along its length.

ALFRED F. REILLY.

REFERENCES CITED

The following references are of record in the file of this patent:

UNITED STATES PATENTS

| Number | Name | Date |
|---|---|---|
| 609,468 | Salignac | Aug. 23, 1898 |
| 813,649 | Jones | Feb. 27, 1906 |
| 1,016,492 | Gunn | Feb. 6, 1912 |
| 1,048,873 | Pietz | Dec. 31, 1912 |
| 1,110,398 | Moran | Sept. 15, 1914 |
| 1,676,683 | Brunhoff | July 10, 1928 |
| 1,947,600 | Isenhower | Feb. 20, 1934 |
| 2,051,777 | Purinton | Aug. 18, 1936 |
| 2,160,602 | Vogel | May 30, 1939 |

FOREIGN PATENTS

| Number | Country | Date |
|---|---|---|
| 15,864 | Great Britain | July 6, 1912 |
| 437,139 | Great Britain | Oct. 24, 1935 |